United States Patent
Yamashita

(10) Patent No.: US 9,071,375 B2
(45) Date of Patent: Jun. 30, 2015

(54) SIGNAL TRANSMITTING APPARATUS, SIGNAL TRANSMITTING METHOD, SIGNAL RECEIVING APPARATUS, SIGNAL RECEIVING METHOD, AND SIGNAL TRANSMISSION SYSTEM

(71) Applicant: Sony Corporation, Tokyo (JP)

(72) Inventor: Shigeyuki Yamashita, Kanagawa (JP)

(73) Assignee: Sony Corporation, Tokyo (JP)

( * ) Notice: Subject to any disclaimer, the term of this patent is extended or adjusted under 35 U.S.C. 154(b) by 150 days.

(21) Appl. No.: 13/863,610

(22) Filed: Apr. 16, 2013

(65) Prior Publication Data
US 2013/0301648 A1 Nov. 14, 2013

(30) Foreign Application Priority Data
May 8, 2012 (JP) ................................. 2012-106676

(51) Int. Cl.
H04L 12/28 (2006.01)
H04J 3/16 (2006.01)
H04N 7/015 (2006.01)
H04N 7/12 (2006.01)

(52) U.S. Cl.
CPC ................. H04J 3/16 (2013.01); H04N 7/015 (2013.01); H04N 7/12 (2013.01)

(58) Field of Classification Search
None
See application file for complete search history.

(56) References Cited

U.S. PATENT DOCUMENTS

| 2006/0119708 A1* | 6/2006 | Rotte et al. ............... 348/207.99 |
| 2007/0116114 A1* | 5/2007 | Kuppens et al. ......... 375/240.03 |

FOREIGN PATENT DOCUMENTS

JP 2011-172164 A 9/2011

* cited by examiner

Primary Examiner — Hassan Phillips
Assistant Examiner — Prenell Jones
(74) Attorney, Agent, or Firm — Fishman Stewart Yamaguchi PLLC

(57) ABSTRACT

In a signal transmitting apparatus, an upper m bits (m≥8) are defined to have the same value in a forbidden code in video data areas channels included in serial digital interfaces of one or plural channels of N bits (N≥10). A mapping unit makes at least a lower 2 bits among the upper m bits different from each other, multiplexing video data of an upper m−2 bits included in compressed data compressed to the amount of data of the one or plural channels of the serial digital interfaces, in which the number of pixels in one frame is equal to or more than that of pixels defined by an HD format into upper m−2 bits in the video data areas of the first and second channels, and multiplexing video data of lower 2 bits in the compressed data into lower N−m bits in the video data areas of the first and second channels.

9 Claims, 11 Drawing Sheets

FIG.2
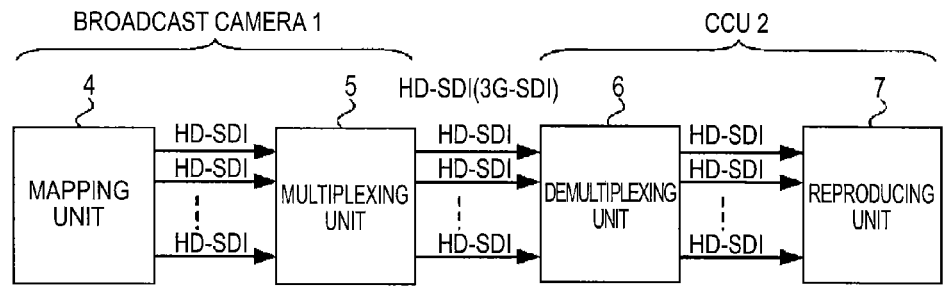
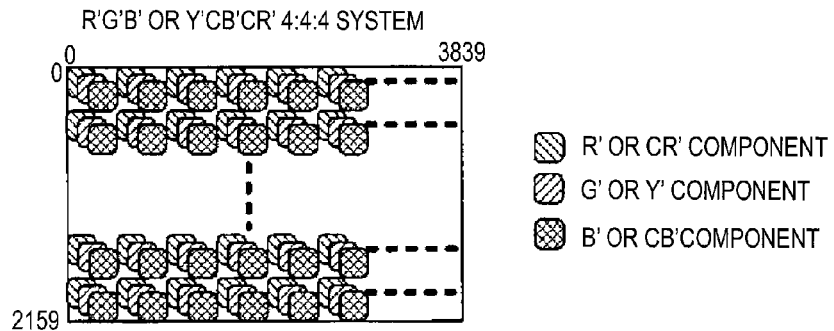
FIG.3A
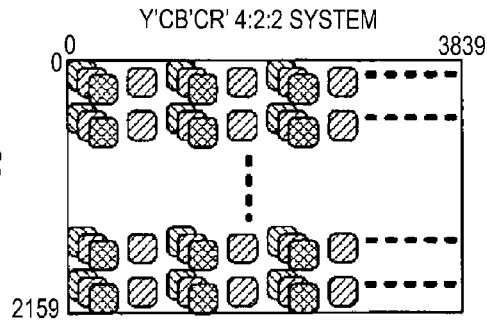
FIG.3B
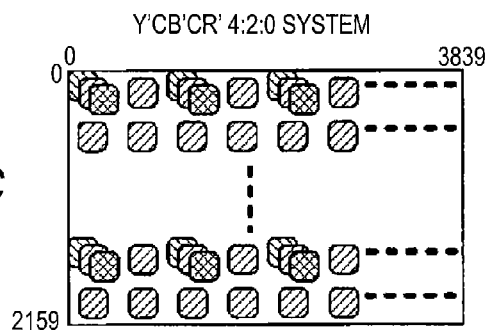
FIG.3C

FIG.4

STRUCTURE OF 10.692-Gbps SERIAL DATA CORRESPONDING TO ONE LINE

| HORIZONTAL AUXILIARY DATA SPACE (HANC DATA) | S A V | VIDEO DATA AREA (ACTIVE LINE) | E A V |
|---|---|---|---|

FIG.5A

COMPRESSED DATA=b7-b0, HD-SDI=B9-B0

| EAV/LN/CRC | HORIZONTAL AUXILIARY DATA SPACE (HANC DATA) | SAV | MULTIPLEX COMPRESSED DATA (b7 TO b2) INTO UPPER 6 BITS (B9 TO B4) OF HD-SDI (C-CHANNEL VIDEO DATA) | B9<br>B4<br>B3 = 1 (FIXED)<br>B2 = 0 (FIXED) |
|---|---|---|---|---|
| | | | MULTIPLEX COMPRESSED DATA (b1 AND b0) INTO LOWER 2 BITS (B1 AND B0) OF HD-SDI | B0 |

FIG.5B

| EAV/LN/CRC | HORIZONTAL AUXILIARY DATA SPACE (HANC DATA) | SAV | MULTIPLEX COMPRESSED DATA (b7 TO b2) INTO UPPER 6 BITS (B9 TO B4) OF HD-SDI (Y-CHANNEL VIDEO DATA) | B9<br>B4<br>B3 = 1 (FIXED)<br>B2 = 0 (FIXED) |
|---|---|---|---|---|
| | | | MULTIPLEX COMPRESSED DATA (b1 AND b0) INTO LOWER 2 BITS (B1 AND B0) OF HD-SDI | B0 |

CONCEPTUAL DIAGRAM ILLUSTRATING MULTIPLEXING IN MODE E

EXAMPLE OF MULTIPLEXING OF SAV/EAV/LN/CRC

EXAMPLE OF DETAILED DATA SERIES IN MODE E IN 10-Gbps SERIAL DIGITAL INTERFACE

FFh EXTRACTED FROM SAV OF CH1 IS REPLACED WITH 2-BYTE K28.5

EXAMPLE OF LINE STRUCTURE OF MODE E

EXAMPLE IN WHICH INITIAL TWO WORDS OF SAV CHANGE TO K28.5

EXAMPLE OF MULTIPLEXING OF LN/CRC

EXAMPLE OF LINE STRUCTURE OF MODE F

SIGNAL TRANSMITTING APPARATUS, SIGNAL TRANSMITTING METHOD, SIGNAL RECEIVING APPARATUS, SIGNAL RECEIVING METHOD, AND SIGNAL TRANSMISSION SYSTEM

FIELD

The present disclosure relates to a signal transmitting apparatus, a signal transmitting method, a signal receiving apparatus, a signal receiving method, and a signal transmission system which are applicable to serially transmit a video signal in which the number of pixels in one frame is equal to or more than the number of pixels defined by an HD-SDI format.

BACKGROUND

In recent years, there is a demand for an ultra-high-definition video signal (4 k or 8 K video signal) with a definition higher than the current HD (High Definition) video signal (2 k video signal), which is a video signal in which one frame is 1920 samples×1080 lines/23.98P-60P, and an image receiving system and an imaging system have been developed.

In the following description, a video signal with a size of m samples by n lines is abbreviated to "m×n". For example, [3840×2160/60P] indicates [the number of pixels in the horizontal direction]×[the number of lines in the vertical direction]/[the number of frames per second]. In addition, in a primary color signal transmission system, [4:4:4] indicates the ratio of [a red signal R:a green signal G:a blue signal B]. In a color-difference signal transmission system, [4:4:4] indicates the ratio of [a brightness signal Y:a first color-difference signal Cb:a second color-difference signal Cr]. Furthermore, "23.98P-60P" is an abbreviation of 23.98P, 24P, 25P, 29.97P, 30P, 50P, 59.94P, and 60P indicating the frame rate of a progressive signal.

JP-A-2011-172164 discloses a technique which performs mapping in the active period of HD-SDI in the mode B to transmit and receive an image signal in which the number of pixels in one frame is more than the number of pixels defined by an HD-SDI format.

In the mode B disclosed in JP-A-2011-172164, data is multiplexed into each of a video data area and a horizontal auxiliary data space of a 10.692-Gbps stream. Then, 8B/10B conversion is performed for 4-word video/EAV/SAV data included in 6-channel (CH1 to CH6) HD-SDI and the converted data is encoded into a 5-word (50-bits) data block. Then, the data block is multiplexed into the video data area of the 10.692-Gbps stream from the head of SAV in the order of channels.

On the other hand, 8B/10B conversion is performed for the horizontal auxiliary data space of 4-channel (CH1 to CH4) HD-SDI, the converted horizontal auxiliary data space is encoded into a 50-bit data block, and the data block is multiplexed into the horizontal auxiliary data space of the 10.692-Gbps stream in the order of channels. However, the horizontal auxiliary data spaces of HD-SDIs of CH5 and CH6 are not transmitted.

SUMMARY

However, even when the mode B is used, only 6-channel (CH1 to CH6) HD-SDI is multiplexed into the 10.692-Gbps stream. Therefore, the following methods have not been proposed: a method which compresses high-volume video data, converts the compressed data into HD-SDI, multiplexes the data into a plurality of channels (for example, 7 channels or 8 channels), and transmits the multiplexed data; and a method which multiplexes data into a 10-Gbps interface and transmits the multiplexed data. Therefore, it is necessary to multiplex a high-volume video data into a plurality of 10.692-Gbps interfaces and transmit the multiplexed data.

Thus, it is desirable to transmit compressed data of video data in which the number of pixels in one frame is equal to or more than the number of pixels defined by the HD-SDI format.

According to an embodiment of the present disclosure, when upper m bits (m≥8) are defined to have the same value in a forbidden code in video data areas of first and second channels included in serial digital interfaces of one channel or a plurality of channels which are formed in a unit of N bits (N≥10), among the upper m bits of the N bits included in the one channel or the plurality of channels, at least lower 2 bits are different from each other. Video data of upper m−2 bits included in compressed data which is compressed to the amount of data of the one channel or the plurality of channels of the serial digital interfaces in which the number of pixels in one frame is equal to or more than the number of pixels defined by an HD format multiplexed into upper m−2 bits in the video data areas of the first channel and the second channel. Video data of lower 2 bits in the compressed data is multiplexed into lower N−m bits in the video data areas of the first channel and the second channel. An error detection code of N-bit data multiplexed into the video data areas of the first channel and the second channel is stored in a first data area and a second data area based on a predetermined standard. The first channel and the second channel are alternately multiplexed for every N bits, the multiplexed data is scrambled, and the scrambled data is transmitted using the serial digital interface.

According to another embodiment of the present disclosure, when upper m bits (m≥8) are defined to have the same value in a forbidden code in video data areas of first and second channels included in serial digital interfaces of one channel or a plurality of channels which are formed in a unit of N bits (N≥10), the first channel and the second channel are alternately demultiplexed from the serial digital interfaces of the one channel or the plurality of channels for every N bits, and descrambling is performed to restore an error detection code of N-bit data in the video data areas of the first channel and the second channel stored in a first data area and a second data area which are based on a predetermined standard. Video data of upper m−2 bits other than lower 2 bits which have different values among the upper m bits of the N bits included in the one channel or the plurality of channels is reproduced, as upper m−2 bits in compressed data which is compressed to the amount of data of the one channel or the plurality of channels of the serial digital interfaces in which the number of pixels in one frame is equal to or more than the number of pixels defined by an HD format, from the upper m−2 bits in the video data areas of the first channel and the second channel. Video data of lower N−m bits is reproduced as lower 2 bits in the compressed data from lower N−m bits in the video data areas of the first channel and the second channel.

In this way, it is possible to transmit compressed data of video data in which the number of pixels in one frame is equal to or more than the number of pixels defined by the HD-SDI format using the serial digital interface.

According to the embodiments of the present disclosure, the third and fourth bits from the lower side in the video data areas of the C channel and the Y channel of the serial digital interface have different values to avoid the forbidden code and the compressed data is multiplexed into an area other than the lower 2 bits in the serial digital interface. Therefore, it is possible to multiplex the compressed data into the existing serial digital interface and transmit the multiplexed data.

BRIEF DESCRIPTION OF THE DRAWINGS

FIG. 2 is a block diagram illustrating the circuit structure of a broadcast camera and a CCU according to the first embodiment of the present disclosure;

FIGS. 3A to 3C are diagrams illustrating an example of the sample structure of a UHDTV signal standard with a resolution of 3840×2160;

FIG. 4 is a diagram illustrating an example of the structure of 10.692-Gbps serial data corresponding to one line when the frame rate is 24P;

FIGS. 5A and 5B are diagrams illustrating an example in which compressed data which is divided in the unit of 8 bits is multiplexed into every 10 bits in the effective areas or V blank areas of a Y channel and a C channel of HD-SDI according to the first embodiment of the present disclosure;

DETAILED DESCRIPTION

Figure 1:
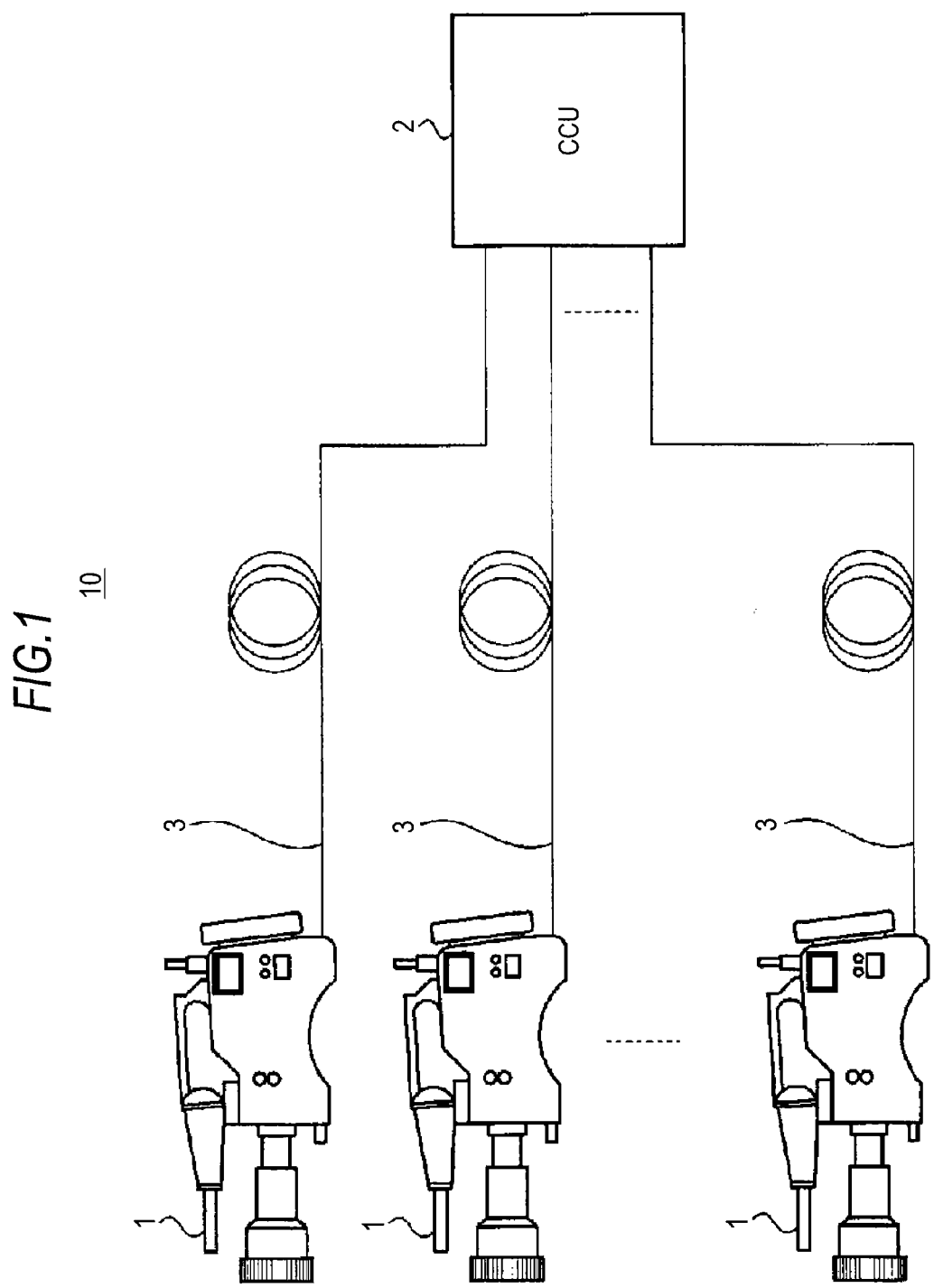
FIG. 1 is a diagram illustrating the overall structure of a television broadcasting station camera transmission system according to a first embodiment of the present disclosure.

Hereinafter, embodiments of the present disclosure will be described. The description will be made in the following order. The same components are denoted by the same reference numerals and the detailed description thereof will not be repeated.

1. First Embodiment (Example of Transmission System for Multiplexing Compressed Data into Multi-channel HD-SDI (3G-SDI))

2. Second Embodiment (Example of Transmission System Using Mode E in 10G-SDI)

3. Third Embodiment (Example of Transmission System Using Mode F in 10G-SDI)

4. Modifications

1. First Embodiment

Example of Transmission System for Multiplexing Compressed Data into Multi-Channel HD-SDI (3G-SDI)

Hereinafter, a first embodiment of the present disclosure will be described with reference to FIGS. 1 to 5B.

In a transmission system according to the first embodiment, a method of thinning out a pixel sample of a 3840× 2160/23.98P-60P/4:4:4/10-bit signal will be described.

FIG. 1 is a diagram illustrating the overall structure of a signal transmission system 10 for a television broadcasting station according to this embodiment. The signal transmission system 10 includes a plurality of broadcast cameras 1 having the same structure and a CCU (camera control unit) 2. Each broadcast camera 1 is connected to the CCU 2 by an optical fiber cable 3. The broadcast camera 1 is used as a signal transmitting apparatus to which a signal transmitting method of transmitting serial digital signals (video signals) is applied. The CCU 2 is used as a signal receiving apparatus to which a signal receiving method of receiving serial digital signals is applied. The signal transmission system 10 including the broadcast cameras 1 and the CCU 2 is used as a signal transmission system which transmits and receives the serial digital signals. The processes performed by these apparatuses may be implemented by the execution of a program as well as the cooperation of hardware components.

The broadcast camera 1 generates a 4 k×2 k ultra-high-definition signal (3840×2160/23.98P-60P/4:4:4/10-bit signal) based on UHDTV1 and transmits the generated signal to the CCU 2.

The CCU 2 controls each broadcast camera 1, receives a video signal from each broadcast camera 1, or transmits a video signal (return video) for displaying, on a monitor of each broadcast camera 1, a video which is being captured by another broadcast camera 1. The CCU 2 functions as a signal receiving apparatus which receives a video signal from each broadcast camera 1.

[Next-Generation 2 k, 4 k, and 8 k Video Signals]

Next, the next-generation 2 k, 4 k, and 8 k video signals will be described.

As an interface for transmitting and receiving video signals at various frame rates, a transmission standard which is known as a mode D is added to SMPTE 435-2 and has been standardized as SMPTE 435-2-2009. SMPTE 435-2 discloses a process of multiplexing data into a 10.692-Gbps serial interface using HD-SDIs of a plurality of channels, which are 10-bit parallel streams defined by SMPTE 292. In general, the data structure of one horizontal line period of HD-SDI includes EAV, a horizontal auxiliary data space (referred to as HANC data or a horizontal blanking period), SAV, and a video data area arranged in this order. In the UHDTV standard, a method in which 3840×2160/23.98P-60P is transmitted by 10-Gbps interfaces of a maximum of two channels and 7680×4320/23.98P-60P is transmitted by 10-Gbps interfaces of a maximum of eight channels has been proposed to SMPTE. This proposal has been defined as a SMPTE 2036-3 standard.

The UHDTV (Ultra High Definition TV) standard, which is the next-generation broadcasting system in which the number of pixels is four times or sixteen times more than that in the current HD standard, has been standardized by the international association. Examples of the international association include ITU (International Telecommunication Union)

and SMPTE (Society of Motion Picture and Television Engineers).

The video standard proposed to ITU or SMPTE relates to a 3840×2160 or 7680×4320 video signal with samples and lines that are two times or four times more than 1920×1080. The video standard standardized by ITU is called LSDI (Large Screen Digital Imagery) and is also called UHDTV proposed to SMPTE. For UHDTV, the video signal is defined as shown in the following Table 1.

TABLE 1

| System category | System name | Brightness or numbers of R', G', and B' samples per effective line | Number of effective lines per frame | Frame rate (Hz) |
|---|---|---|---|---|
| UHDTV1 | 3840×2160/23.98/P | 3840 | 2160 | 24/1.001 |
| | 3840×2160/24/P | 3840 | 2160 | 24 |
| | 3840×2160/25/P | 3840 | 2160 | 25 |
| | 3840×2160/29.97/P | 3840 | 2160 | 30/1.001 |
| | 3840×2160/30/P | 3840 | 2160 | 30 |
| | 3840×2160/50/P | 3840 | 2160 | 50 |
| | 3840×2160/59.94/P | 3840 | 2160 | 60/1.001 |
| | 3840×2160/60/P | 3840 | 2160 | 60 |
| UHDTV2 | 7680×4320/23.98/P | 7680 | 4320 | 24/1.001 |
| | 7680×4320/24/P | 7680 | 4320 | 24 |
| | 7680×4320/25/P | 7680 | 4320 | 25 |
| | 7680×4320/29.97/P | 7680 | 4320 | 30/1.001 |
| | 7680×4320/30/P | 7680 | 4320 | 30 |
| | 7680×4320/50/P | 7680 | 4320 | 50 |
| | 7680×4320/59.94/P | 7680 | 4320 | 60/1.001 |
| | 7680×4320/60/P | 7680 | 4320 | 60 |

Image sample structure and frame rate of UHDTV system

As standards applied to digital cameras in the film industry, 2048×1080 and 4096×2160 signal standards are standardized as SMPTE 2048-1 and SMPTE 2048-2, as shown in the following Tables 2 and 3.

TABLE 2

| System NO. | System name | Frame rate (Hz) |
|---|---|---|
| 1 | 2480×1080/60/P | 60 |
| 2 | 2480×1080/59.94/P | 60/1.001 |
| 3 | 2480×1080/50/P | 50 |
| 4 | 2480×1080/48/P | 48 |
| 5 | 2480×1080/47.95/P | 48/1.001 |
| 6 | 2480×1080/30/P | 30 |
| 7 | 2480×1080/29.97/P | 30/1.001 |
| 8 | 2480×1080/25/P | 25 |
| 9 | 2480×1080/24/P | 24 |
| 10 | 2480×1080/23.98/P | 24/1.001 |

Pixel arrangement and frame rate of 2480×1080 image

TABLE 3

| System NO. | System name | Frame rate (Hz) |
|---|---|---|
| 1 | 4096×2160/60/P | 60 |
| 2 | 4096×2160/59.94/P | 60/1.001 |
| 3 | 4096×2160/50/P | 50 |
| 4 | 4096×2160/48/P | 48 |
| 5 | 4096×2160/47.95/P | 48/1.001 |
| 6 | 4096×2160/30/P | 30 |
| 7 | 4096×2160/29.97/P | 30/1.001 |
| 8 | 4096×2160/25/P | 25 |
| 9 | 4096×2160/24/P | 24 |
| 10 | 4096×2160/23.98/P | 24/1.001 |

Pixel arrangement and frame rate of 4096×2160 image

FIG. 2 is a block diagram illustrating the signal transmitting apparatus and the signal receiving apparatus according to this embodiment in the circuit structure of the broadcast camera 1 and the CCU 2.

First, a 3840×2160/23.98P-60P/4:4:4/10-bit signal generated by an imaging unit and a video signal processing unit (not shown) in the broadcast camera 1 is transmitted to a mapping unit 4.

As shown in Table 1, the 3840×2160/23.98P-60P/4:4:4/10-bit signal corresponds to one frame of a UHDTV1 class image. One frame period of the signal is 1.001/24 seconds, 1/24 seconds, 1/25 seconds, 1.001/30 seconds, 1/30 seconds, 1/50 seconds, 1.001/60 seconds, and 1/60 seconds, and one frame period includes 2160 effective line periods. Therefore, in the video signal, the number of pixels in one frame is more than the number of pixels defined by the HD-SDI format.

In the UHDTV1 class image defined by S2036-1, the number of samples in an active line is 3840, the number of lines is 2160, and G, B, and R video data items are arranged in the active lines of a G data series, a B data series, and an R data series.

The mapping unit 4 maps the 3840×2160/23.98P-60P/4:4:4/10-bit signal to a video data area of an 8-channel transmission stream (hereinafter, abbreviated to HD-SDI) defined by the HD-SDI format. In this case, the mapping unit 4 makes at least the lower 2 bits among the upper m bits of N bits included in one channel or a plurality of channels different from each other, multiplexes video data of the upper m−2 bits included in the compressed data which is compressed to the amount of data of one channel or a plurality of channels of the serial digital interfaces in which the number of pixels in one frame is equal to or more than the number of pixels defined by the HD format into the upper m−2 bits in the video data areas of the first channel and the second channel, and multiplexes video data of the lower 2 bits in the compressed data into the lower N−m bits in the video data areas of the first channel and the second channel. In this embodiment, among the upper 8 bits of 10 bits included in a plurality of channels, at least the lower 2 bits have different values. Video data of the upper 6 bits included in the compressed data which is compressed to the amount of data of a plurality of channels of SDIs in which the number of pixels in one frame is more than the number of pixels defined by the HD-SDI format is multiplexed into the upper 6 bits in the video data areas of a C channel and a Y channel. Video data of the lower 2 bits in the compressed data is multiplexed into the lower 2 bits in the video data areas of the C channel and the Y channel.

For example, in each effective line period of 8-channel HD-SDI, a timing reference signal EAV (End of Active Video), a line number LN, an error detection code CRC, and a horizontal auxiliary data space (auxiliary data/undefined word data section) are arranged. In addition, in each effective line period, a timing reference signal SAV (Start of Active Video) and an active line, which is a video data section, are arranged.

The multiplexing unit 5 stores the error detection code of N-bit data multiplexed into the video data areas of the first channel and the second channel in a first data area and a second data area which are based on a predetermined standard, alternately multiplexes the first channel and the second channel for every N bits, scrambles the multiplexed data, and transmits the scrambled data using the serial digital interface. In this embodiment, CRC of the N-bit data multiplexed into the video data areas of the C channel and the Y channel, that is, CRC of 10-bit data obtained by multiplexing the 8-bit compressed data is stored in CCRC and YCRC based on SMPTE ST 292-1. Then, the C channel and the Y channel are alternately multiplexed for every N bits, scrambled, and transmitted as multi-channel HD-SDI (3G-SDI).

[Example of Sample Structure of UHDTV Signal Standard]

Next, an example of the sample structure of the UHDTV signal standard will be described with reference to FIGS. 3A to 3C. FIGS. 3A to 3C are diagrams illustrating an example of the sample structure of the UHDTV signal standard at a resolution of 3840×2160. In FIGS. 3A to 3B, one frame is 3840×2160.

There are the following three kinds of sample structures of the signal standard at a resolution of 3840×2160. In the SMPTE standard, a signal having a dash "'" added thereto, such as R', G', or B', indicates a signal to be subjected to, for example, gamma correction.

FIG. 3A shows an example of an R'G'B' or Y'Cb'Cr' 4:4:4 system. In this system, all samples include RGB or YCbCr components.

FIG. 3B shows an example of a Y'Cb'Cr' 4:2:2 system. In this system, the even-numbered samples include the YCbCr components and the odd-numbered samples include a Y component.

FIG. 3C shows an example of a Y'Cb'Cr' 4:2:0 system. In this system, the even-numbered samples include the YCbCr components, the odd-numbered samples include the Y component, and the CbCr components in the odd-numbered lines are thinned out.

[Example of Structure of 10.692-Gbps Serial Data]

Next, an example of the 10.692-Gbps serial data corresponding to one line defined by the HD-SDI format will be described with reference to FIG. 4.

FIG. 4 is a diagram illustrating an example of the structure of the 10.692-Gbps serial data corresponding to one line.

In FIG. 4, data including a line number LN and an error detection code CRC is represented as SAV, a video data area (active line), and EAV, and data including an addition data area is represented as a horizontal auxiliary data space.

[Example of Multiplexing of Compressed Data into Multi-Channel HD-SDI (3G-SDI)]

FIGS. 5A and 5B are diagrams illustrating an example in which compressed data which is divided in the unit of 8 bits is multiplexed into every 10 bits in the effective areas or the V blank areas of the Y channel and the C channel of HD-SDI. FIG. 5A shows an example of the Y channel of HD-SDI and FIG. 5B shows an example of the C channel of HD-SDI. In FIGS. 5A and 5B, the positions of bits in the compressed data are represented by b0 to b7 and the positions of bits in the effective video area in HD-SDI are represented by B0 to B9.

The mapping unit 4 compresses a video signal of a 2 k image, a 4 k image, or an 8 k image and extracts 8-bit (b0, b1, b2, b3, b4, b5, b6, and b7) compressed data from a signal whose data is reduced to a plurality of channels in terms of the amount of data of 1.5-Gbps HD-SDI. Then, the mapping unit 4 multiplexes b0 to b7 of the compressed data into B0, B1, B2, B3, B4, B5, B6, B7, B8, and B9 of 10-bit data in the video data area including the effective area or the V blank area of HD-SDI. In this case, b7 to b2 of the compressed data are multiplexed into the upper 6 bits (B9 to B4) of HD-SDI and b1 and b0 of the compressed data are multiplexed into the lower 2 bits (B1 and B0) of HD-SDI.

In a forbidden code of the video data areas of the first channel and the second channel which are included in the serial digital interfaces of one channel or a plurality of channels which are formed in the unit of N bits (N≥10), all of the upper m bits (m≥8) are defined to have the same value. In this embodiment, in the forbidden code in the video data areas of the C channel and the Y channel in the 10-bit serial digital interfaces (3G-SDIs or HD-SDIs) of a plurality of channels, all of the upper 8 bits are defined to have 0 or 1. Therefore, among the upper 8 bits (m bits) of the 10 bits included in the plurality of channels, at least the lower 2 bits have different values. Specifically, fixed values, 1 and 0, are incorporated into 2 bits, that is, B3 and B2 of HD-SDI into which the compressed data is not multiplexed, respectively. In addition, B3 and B2 may be fixed to 0 and 1, respectively. In this way, forbidden codes 000h to 003h and 3FFh to 3FCh are prevented from being generated in the effective area or the V blank area of HD-SDI.

In this way, CRC of the 10-bit data obtained by multiplexing the 8-bit compressed data into the effective areas or the V blank areas of the C channel and the Y channel of HD-SDI (3G-SDI) is calculated by a method based on SMPTE ST 292-1 and is then stored in CCRC and YCRC. Then, the C channel and the Y channel are alternately multiplexed for every 10 bits into HD-SDI, scrambling is performed for the multiplexed data, and the scrambled data is transmitted as multi-channel HD-SDI (3G-SDI).

Returning to FIG. 2, a demultiplexing unit 6 of the CCU 2 alternately demultiplexes the first channel and the second channel from the serial digital interfaces of one channel or a plurality of channels for every N bits and performs descrambling to restore the error detection code of the N-bit data in the video data areas of the first channel and the second channel stored in the first data area and the second data area which are based on a predetermined standard. In this embodiment, the C channel and the Y channel are alternately demultiplexed from the serial digital interfaces for every N bits and descrambling is performed to restore CRCC of the N-bit data in the video data areas of the C channel and the Y channel stored in CCRC and YCRC based on SMPTE ST 292-1. That is, when multi-channel HD-SDI (3G-SDI) is received from the broadcast camera 1, the demultiplexing unit 6 performs a descrambling process opposite to the process of the multiplexing unit 5. Then, the CRC of the 10-bit data which is obtained by multiplexing the 8-bit compressed data into the effective areas or the V blank areas of the C channel and the Y channel of HD-SDI (3G-SDI) is extracted from HD-SDI in which the C channel and the Y channel are alternately multiplexed for every 10 bits.

Then, a reproducing unit 7 of the CCU 2 reproduces video data of the upper m−2 bits other than the lower 2 bits which have different values among the upper m bits of the N bits included in one channel or a plurality of channels, as the upper m−2 bits in the compressed data which is compressed to the amount of data of one channel or a plurality of channels of the serial digital interfaces in which the number of pixels in one frame is equal to or more than the number of pixels defined by the HD format, from the upper m−2 bits in the video data areas of the first channel and the second channel, and reproduces video data of the lower N−m bits as the lower 2 bits in the compressed data from the lower N−m bits in the video data areas of the first channel and the second channel. The reproducing unit 7 according to this embodiment reproduces video data of the upper 6 bits other than the lower 2 bits which have different fixed values among the upper 8 bits of 10 bits included in one channel or a plurality of channels as the upper 6 bits in the compressed data from the upper 6 bits in the video data areas of the C channel and the Y channel, and reproduces video data of the lower 2 bits as the lower 2 bits in the compressed data from the lower 2 bits in the video data areas of the C channel and the Y channel. That is, the reproducing unit 7 extracts 8-bit compressed data b0 to b7 from 10-bit data in the video data areas including the effective areas or the V blank areas of multi-channel HD-SDI. That is, the reproducing unit 7 calculates data which is extracted from the upper 6 bits (B9 to B4) among B0 to B9 of the 10-bit data multiplexed into the video data area including the effective area or the V blank area of HD-SDI as b7 to b2 of the compressed data. In addition, the reproducing unit 7 calculates data which is extracted from the lower 2 bits (B1 and B0) as b1 and b0 of the compressed data. Then, the reproducing unit 7 reproduces the video signal of the 2 k image, the 4 k image, or the 8 k image.

According to the signal transmission system 10 of the first embodiment, the compressed data of the high-volume video signal of, for example, 2 k (HD), 4 k, or 8 k pixels is sequentially multiplexed in the unit of 8 bits into the effective pixel areas of HD-SDIs or 3G-SDIs of a plurality of channels and is then transmitted.

The data which is compressed by, for example, an MPEG system is divided in the unit of 8 bits (b0 to b7) and is multiplexed into 10-bit data which is sequentially represented by B0 to B9 from the lower side of the effective area or the V blank area of HD-SDI or 3G-SDI. In order to prevent the forbidden code, B3 is fixed to 1 and B2 is fixed to 0 (B3 may be fixed to 0 and B2 may be fixed to 1). In this way, it is possible to multiplex the compressed data into HD-SDIs or 3G-SDIs of a plurality of channels and transmit the multiplexed data.

In the system defined by SMPTE ST 348 according to the related art, for example, the compressed data is multiplexed into B7 to B0 among B0, B1, B2, B3, B4, B5, B6, B7, B8, and B9, which are 10-bit data of HD-SDI. Then, in order to avoid the forbidden code, B8 is defined as the even-numbered parities of B7 to B0 and B9 is defined as the inverted bit of B8. In this method, since the upper bits B9 and B8 are reset, it is difficult to check a compressed data transmission system using a video signal, such as a color bar, from a general HD signal source while viewing the image.

However, in the broadcast camera 1 according to this embodiment, in order to avoid the forbidden code, CRC is reset using B3=1 and B2=0 and is then transmitted. The transmission system of the mapping unit 4 is different from that according to the related art and the lower bits, not the upper bits, are used as much as possible in order to avoid the forbidden code. Therefore, it is possible to observe a video signal, such as a color bar, as a substantially original color bar image using a waveform monitor and thus check whether the transmission system is normal with eyes. In addition, since CRC is reset and transmitted, it is possible to observe an error in the transmission system using a CRC observation function of the waveform monitor. As described above, it is possible to verify the transmission system while viewing the image from the HD signal source or using the CRC function and thus improve the efficiency of development.

2. Second Embodiment

Example of Transmission System Using Mode E in 10G-SDI

Next, a signal transmission system 10 according to a second embodiment of the present disclosure will be described with reference to FIGS. 6 to 11. In this embodiment, the mode E is used as the transmission system. Hereinafter, the mode E, which is the transmission system that multiplexes compressed data multiplexed into 8-channel HD-SDI, will be described.

Figure 6:
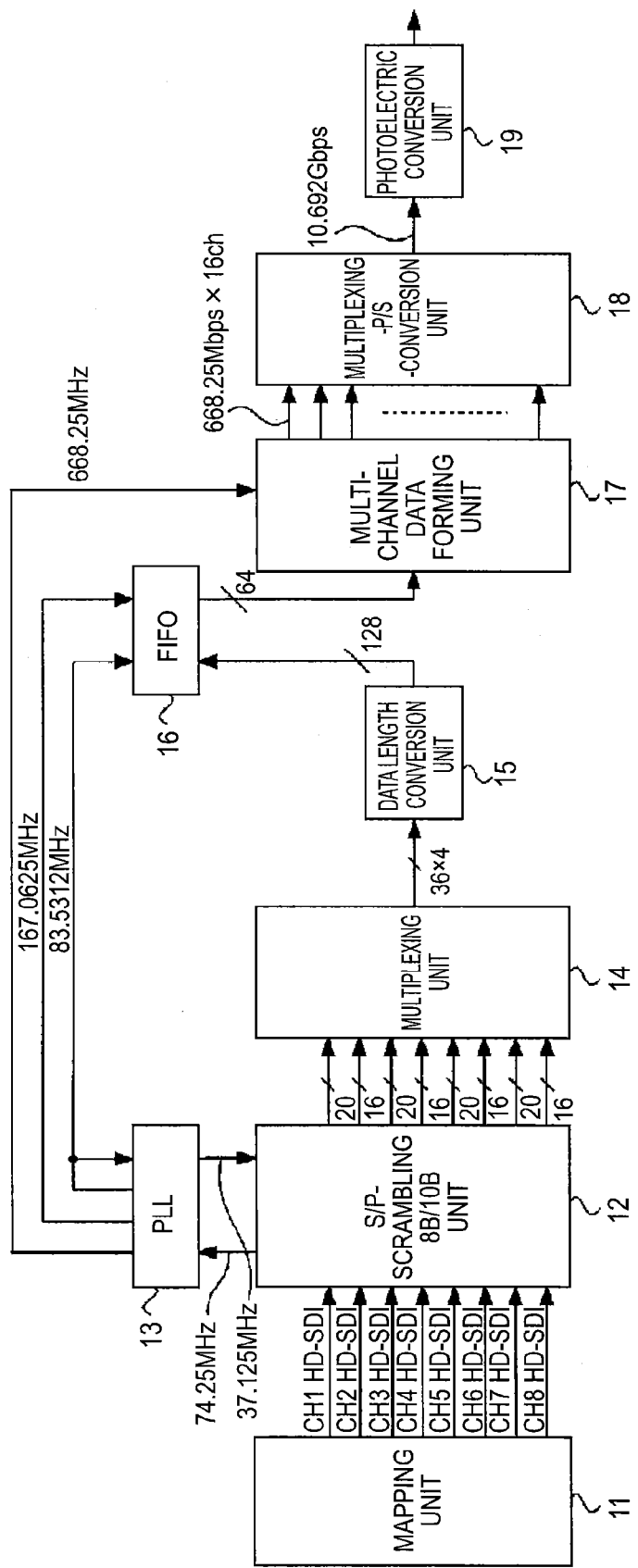
FIG. 6 is a block diagram illustrating a signal transmitting apparatus related to a second embodiment in the circuit structure of a broadcast camera according to the second embodiment of the present disclosure.

FIG. 6 is a block diagram illustrating a signal transmitting apparatus according to this embodiment in the circuit structure of a broadcast camera 1.

A 3840×2160/23.98P-60P/4:4:4/10-bit signal which is generated by an imaging unit and a video signal processing unit (not shown) in the broadcast camera 1 is transmitted to a mapping unit 11.

In this embodiment, the mode E, which will be described below, is used to transmit the compressed data of a video signal of 2 k, 4 k, or 8 k pixels. The use of the mode E makes it possible to multiplex the 8-channel HD-SDI, into which the compressed data is multiplexed, into a 10.692-Gbps serial digital interface (hereinafter, abbreviated to "10G-SDI") and transmit the multiplexed data.

Similarly to the mapping unit 4 according to the first embodiment, the mapping unit 11 maps the 3840×2160/23.98P-60P/4:4:4/10-bit signal to a video data area of 8-channel HD-SDI. The description of the details of this process will be omitted.

HD-SDI signals of CH1 to CH8 mapped by the mapping unit 11 are transmitted to an S/P-scrambling-8B/10B unit 12. Then, 8 bit/10 bit-encoded parallel data with a 20-bit width is written to a FIFO memory (not shown) by a 37.125-MHz clock from a PLL 13. Then, the parallel data with a 20-bit width is read by an 83.5312-MHz clock from the PLL 13 and is transmitted to the S/P-scrambling-8B/10B unit 12 which is used as an example of a conversion unit.

In this embodiment, the compressed data is multiplexed into the effective areas and the V blank areas of HD-SDIs of a plurality of channels (8 channels in this embodiment), or 4-channel 3G-SDI data which is created by two-channel and one-word HD-SDI into which the compressed data is multiplexed is used as the input and output of 10G-SDI. Therefore, in this embodiment, 8-channel HD-SDI is used as the input and output of 10G-SDI.

Figure 7:
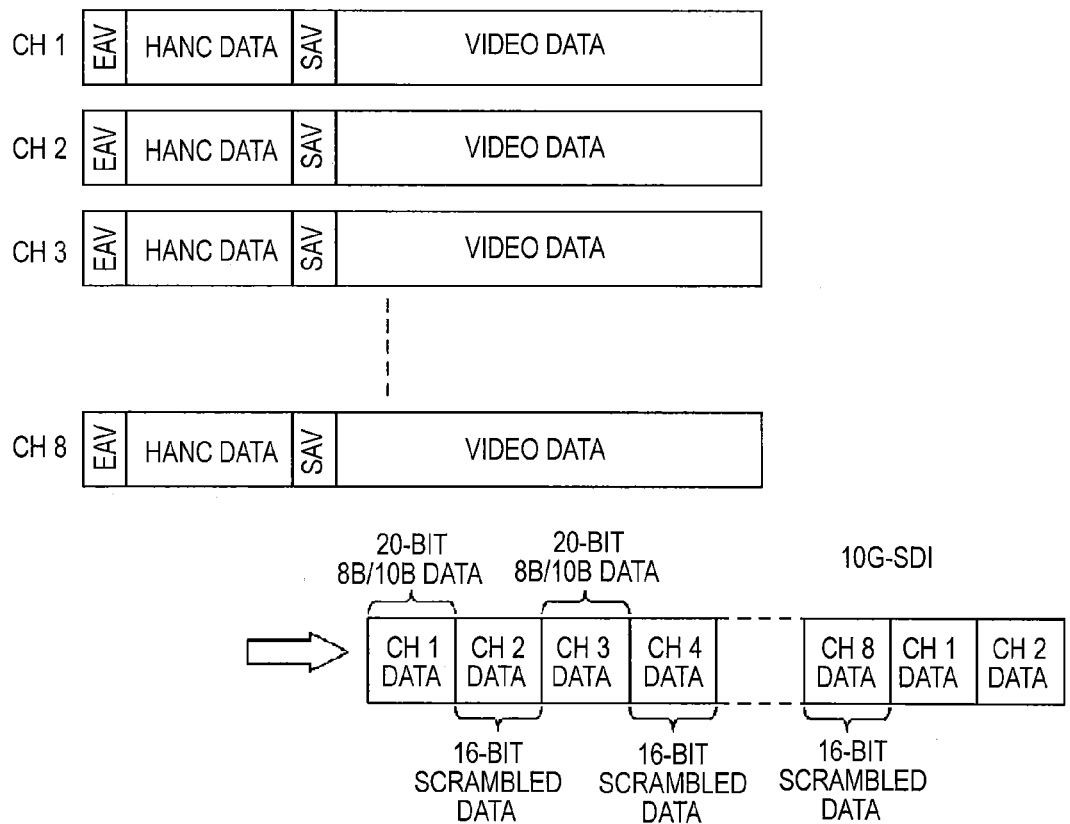
FIG. 7 is a conceptual diagram illustrating an example of multiplexing in a mode E according to the second embodiment of the present disclosure.

FIG. 7 is a conceptual diagram illustrating an example of multiplexing in the mode E.

In the case of a 3G-SDI level B, the first and second channel of HD-SDI respectively correspond to data streams 1 and 2 of the first channel of 3G-SDI and the third and fourth channels of HD-SDI respectively correspond to data streams 1 and 2 of the second channel of 3G-SDI. The fifth and sixth channels of HD-SDI respectively correspond to data streams 1 and 2 of the third channel of 3G-SDI and the seventh and eighth channels of HD-SDI respectively correspond to data streams 1 and 2 of the fourth channel of 3G-SDI.

The S/P-scrambling-8B/10B unit 12 is used as a conversion unit that performs 8B/10B conversion for data of a predetermined number of bits which is extracted from the odd-numbered serial digital interfaces among the serial digital interfaces of a plurality of channels and scrambles data of a predetermined number of bits which is extracted from the even-numbered serial digital interfaces. In the mode E, for each of the first, third, fifth, and seventh channels of HD-SDI, the S/P-scrambling-8B/10B unit 12 according to this embodiment extracts 8 bits from the initial word of SAV and sequentially performs 8B/10B conversion for 16-bit (8 bits×2 samples) compressed data to obtain a 20-bit data block. For each of the second, fourth, sixth, and eighth channels of HD-SDI, the S/P-scrambling-8B/10B unit 12 extracts 8 bits from the initial word of SAV and sequentially scrambles the 16-bit (8 bits×2 samples) compressed data to obtain a 16-bit data block.

Then, a multiplexing unit 14 alternately connects the 8B/10B-converted data and the scrambled data and outputs the connected data as 10G-SDI. That is, the multiplexing unit 14 alternately multiplexes the 20-bit data block obtained by extracting 16-bit data from the odd-numbered channels of the first to eighth channels of HD-SDI and performing 8B/10B conversion for the 16-bit data and the 16-bit data block obtained by extracting 16-bit data from the even-numbered channels and then scrambling the 16-bit data in the order of CH1, CH2, CH3, CH4, CH5, CH6, CH7, CH8, CH1, CH2, . . . . As such, parallel signals of CH1 to CH8 are converted into a serial signal and a 10.692-Gbps serial signal is output.

When the first to eighth channels of HD-SDI are converted into the 10.692-Gbps serial signal, the following Expression 1 is satisfied.

$$74.25[\text{MHz}] \times 16[\text{bit}] \times 4[\text{ch}] \times 10/8 + 74.25[\text{MHz}] \times 16[\text{bit}] \times 4[\text{ch}] = 10.692[\text{Gbps}] \quad (1)$$

Figure 8:
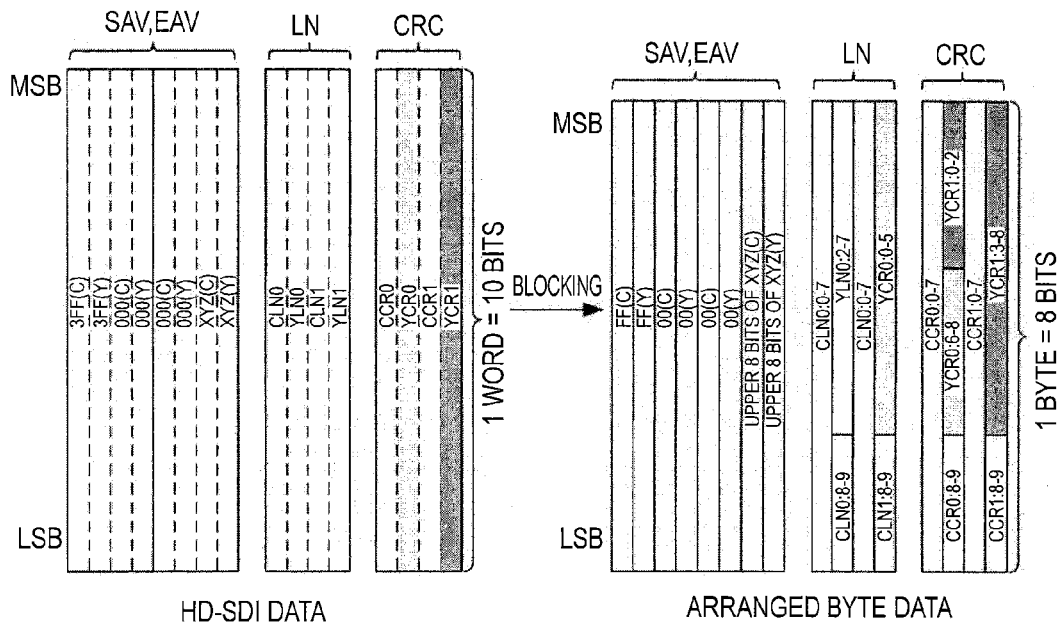
FIG. 8 is a diagram illustrating an example of the multiplexing of SAV/EAV/LN/CRC according to the second embodiment of the present disclosure.

FIG. 8 is a diagram illustrating an example of the multiplexing of SAV/EAV/LN/CRC.

As described above, HD-SDI includes SAV/EAV/LN/CRC and data of the C channel and the Y channel is alternately multiplexed into HD-SDI.

The multiplexing unit 14 extracts the upper 8 bits of data in which one word is 10 bits since the lower 2 bits is reserve=0 in 3FFh, 000 h, 000 h, and XYZ of SAV and EAV included in HD-SDI. In addition, in LN and CRC after EAV, since CLN and YCL are equal to each other, a YLN signal is discarded. Then, the multiplexing unit 14 rearranges CLN, CCR, and YCR and multiplexes them as 8-bit data to create 10.692-Gbps serial data.

The multiplexing unit 14 rearranges the HD-SDI data in the order of (1) to (5) and multiplexes the HD-SDI data into the 10.692-Gbps serial data.

(1) In LN, subsequently to CLN0:0 to CLN0:7 (indicating a zeroth bit to a seventh bit, which holds for the following description), CLN0:8 and CLN0:9, and YLN0:2 to YLN0:7, which are the lower 8 bits of CLN0, are multiplexed. The same data is included in CLN and YLN and the content of YLN0:2 to YLN0:7 is determined from CLN0:2 to CLN0:7. Therefore, data, such as all1, may be incorporated into YLN0:2 to YLN0:7.

(2) Subsequently to CLN1:0 to CLN1:7, CLN1:8 and CLN1:9, and YCR0:0 to YCR0:5 are multiplexed.

(3) In CRC, subsequently to LN, CCR0:0 to CCR0:7 are multiplexed.

(4) Then, CCR0:8 and CCR0:9, YCR0:6 to YCR0:8, and YCR1:0 to YCR1:2 are multiplexed.

(5) Then, CCR1:0 to CCR1:7, CCR1:8 and CCR1:9, and YCR1:3 to YCR1:8 are multiplexed.

Since B9 of CRC is an inverted bit of B8, it is removed and is not multiplexed into the 10.692-Gbps serial data. In addition, CCRC and YCRC are data which is calculated after the compressed data is multiplexed.

Figure 9:
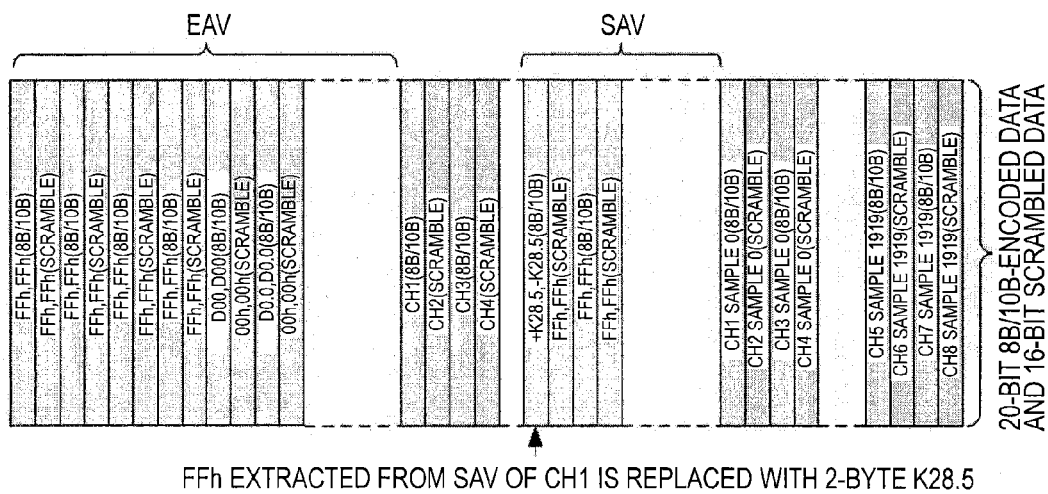
FIG. 9 is a diagram illustrating an example of a detailed data series in the mode E in 10G-SDI according to the second embodiment of the present disclosure.

FIG. 9 is a diagram illustrating an example of a detailed data series in the mode E in 10G-SDI.

During the 8B/10B conversion of the S/P-scrambling-8B/10B unit 12, the initial two words (16 bits) of SAV change to 2-byte K28.5 and are used as a word synchronous signal of an 8B/10B conversion code.

Then, 8B/10B conversion is performed for every 8 bits in Y/C-ch of ch1, ch3, ch5, and ch7 and frame synchronous scrambling (scrambling is performed at given timing) is performed for every 8 bits of Y/C-ch of ch2, ch4, ch6, and ch8. In this way, the above-mentioned Expression 1 is satisfied.

In addition, B8 of CS (check sum) of an audio data signal is moved to, for example, B7 at which the reserve of UDW1=0 and B7 is used. Furthermore, signal processing may be applied which moves the AF (audio frame) of an audio control signal, DEL1-2, DEL3-4, and B8 of CS to, for example, B0 to B7 of the reserved word of UDW9 and UDW10 to extract the lower 8 bits from the audio data signal and the audio control signal. For ANC data, when B8 and B9 are used, similarly, movement to reserved bits B0 to B7 in the ANC data may be performed to extract the lower 8 bits from an H blank area of HD-SDI.

Figure 10:
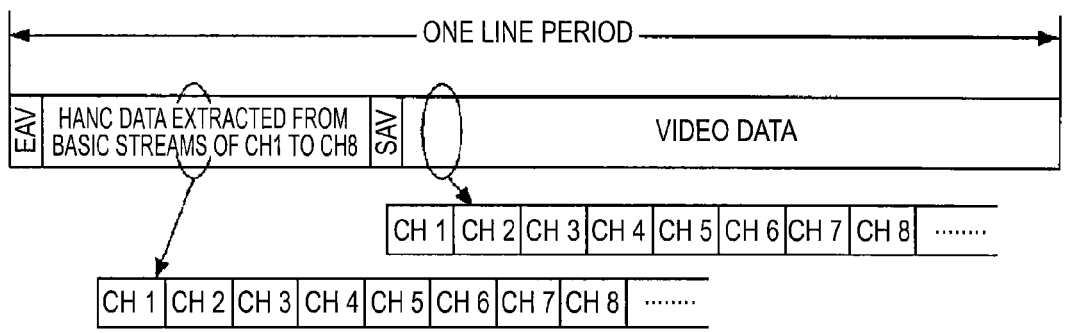
FIG. 10 is a diagram illustrating an example of the line structure of the mode E according to the second embodiment of the present disclosure.

FIG. 10 is a diagram illustrating an example of the line structure of the mode E.

The multiplexing unit 14 multiplexes the 8B/10B-converted 20-bit data and the scrambled 16-bit data into 10G-SDI. In this case, the horizontal auxiliary data space extracted from the basic streams (HD-SDIs) of CH1 to CH8 is multiplexed in the order of CH1, CH2, . . . , CH8, and CH1. Similarly, video data extracted from the basic streams of CH1 to CH8 is multiplexed in the order of CH1, CH2, . . . , CH8, and CH1. During the multiplexing, as described above, the odd-numbered channel is the 8B/10B-converted 20-bit data and the even-numbered channel is the scrambled 16-bit data.

Table 4 shows the number of data items in one line, the number of data items in the video data area, the number of data items in the horizontal auxiliary data space (HANC) area and SAV/EAV/LN/CRC, and the number of data items in additional data for each frame rate of the 10.692-Gbps interface.

TABLE 4

| Frame rate | Total number of words per line (bits) | Video data (bits) | Data in HANC and EAV/SAV (bits) | Additional data (bits) |
|---|---|---|---|---|
| 23.98 Hz or 24 Hz | 396000 | 286080 | 119520 | 0 |
| 25 Hz | 380160 | 286080 | 103680 | 0 |
| 29.97 Hz or 30 Hz | 316800 | 286080 | 40320 | 0 |

Image data, H blank data, and additional data in one line in mode E

Description returns to FIG. 6.

The number of bits in the signal output from the multiplexing unit 14 is calculated using SAV, the number of data items in the video data area, EAV/LN/CRCC, and an H blank period as follows.

$$20+16+20+16+20+16+20+16=144 \text{ bits} \quad (1)$$

The parallel data with a width of 36×4 (=144) bits which is multiplexed by the multiplexing unit 14 is transmitted to a data length conversion unit 15. The data length conversion unit 15 includes a shift register. The parallel data with a 144-bit width is converted into parallel data with a 128-bit width.

The parallel data with the 128-bit width converted by the data length conversion unit 15 is transmitted to a FIFO memory 16 and is written to the FIFO memory 16 by an 83.5312-MHz clock from the PLL 13.

The parallel data with the 128-bit width written to the FIFO memory 16 is read as parallel data with a 64-bit width from the FIFO memory 16 by a 167.0625-MHz clock from the PLL 13. Then, the read parallel data with the 64-bit width is transmitted to a multi-channel data forming unit 17.

The multi-channel data forming unit 17 is, for example, XSBI (Ten gigabit Sixteen Bit Interface: a 16-bit interface used in a 10-gigabit Ethernet (registered trademark) system). The multi-channel data forming unit 17 forms serial data corresponding to 16 channels from the parallel data with the 64-bit width read from the FIFO memory 16 using a 668.25-MHz clock from the PLL 13. The serial data has a bit rate of 668.25 Mbps. The 16-channel serial data formed by the multi-channel data forming unit 17 is transmitted to a multiplexing and P/S conversion unit 18.

The multiplexing and P/S conversion unit 18 multiplexes the 16-channel serial data from the multi-channel data forming unit 17 and performs parallel/serial conversion for the multiplexed parallel data. In this way, a 10.692-Gbps (=668.25 Mbps×16) serial data is generated.

The 10.692-Gbps serial data generated by the multiplexing and P/S conversion unit 18 is transmitted to a photoelectric conversion unit 19. The photoelectric conversion unit 19 functions as an output unit that outputs the 10.692-Gbps serial data to the CCU 2. The 10.692-Gbps serial data which is converted into an optical signal by the photoelectric conversion unit 19 is transmitted from the broadcast camera 1 to the CCU 2 through an optical fiber cable 3.

[Example of Internal Structure and Operation of CCU]

Next, an example of the internal structure of the CCU 2 will be described.

Figure 11:
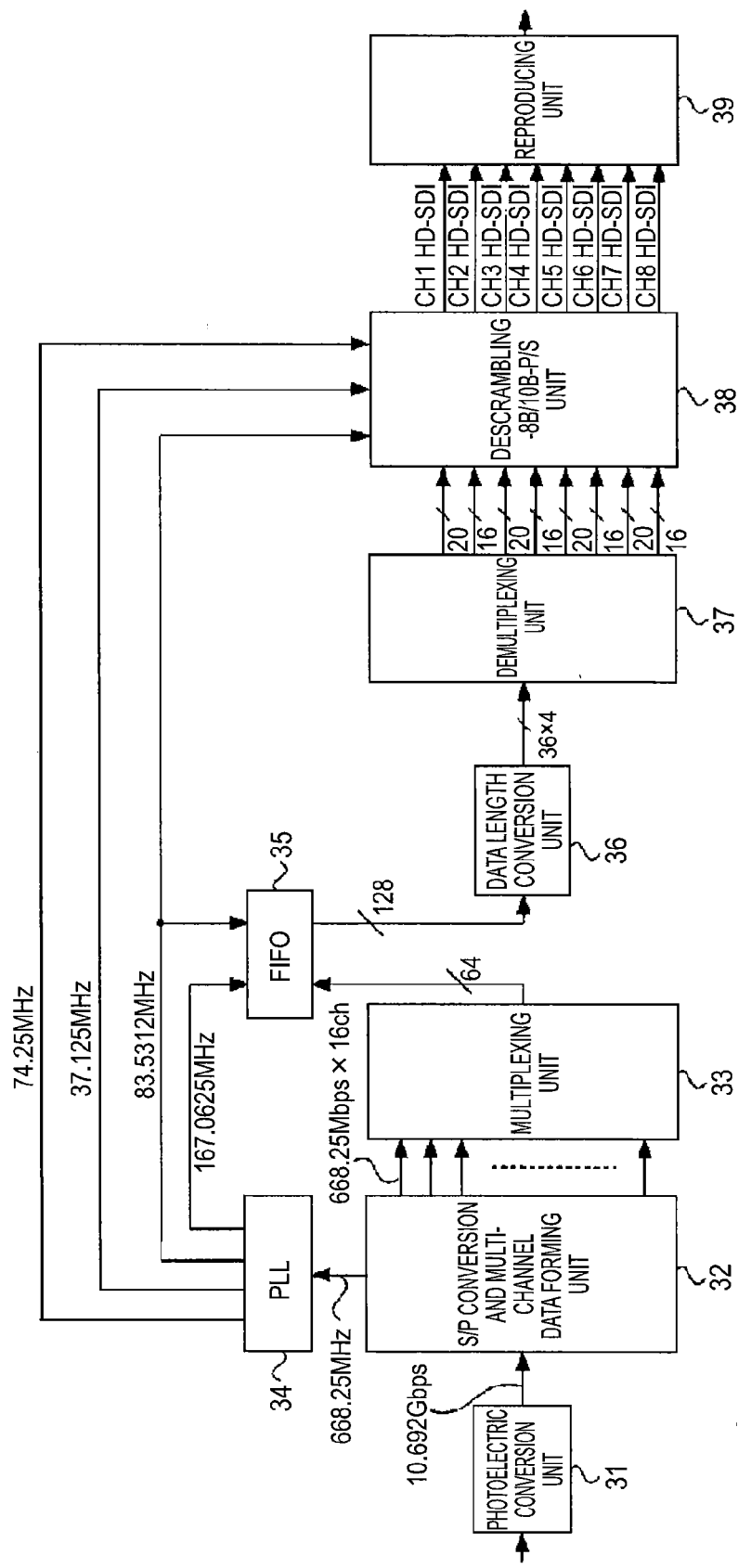
FIG. 11 is a block diagram illustrating a portion related to the second embodiment in the circuit structure of a CCU according to the second embodiment of the present disclosure.

FIG. 11 is a block diagram illustrating a portion of the circuit structure of the CCU 2 according to this embodiment. The CCU 2 is provided with a plurality of sets of the circuits which are in one-to-one correspondence with the broadcast cameras 1.

The 10.692-Gbps serial data which is transmitted from the broadcast camera 1 through the optical fiber cable 3 is converted into an electric signal by the photoelectric conversion unit 31 and is then transmitted to an S/P conversion and multi-channel data forming unit 32. The S/P conversion and multi-channel data forming unit 32 is, for example, XSBI. The S/P conversion and multi-channel data forming unit 32 receives the 10.692-Gbps serial data.

The S/P conversion and multi-channel data forming unit 32 performs serial/parallel conversion for the 10.692-Gbps serial data. Then, the S/P conversion and multi-channel data forming unit 32 forms serial data items corresponding to 16 channels, each having a bit rate of 668.25 Mbps, from the converted parallel data and extracts a clock of 668.25 MHz.

The 16-channel parallel data formed by the S/P conversion and multi-channel data forming unit 32 is transmitted to a multiplexing unit 33. The 668.25-MHz clock extracted by the S/P conversion and multi-channel data forming unit 32 is transmitted to a PLL 34.

The multiplexing unit 33 multiplexes the 16-channel serial data received from the S/P conversion and multi-channel data forming unit 32 and transmits parallel data with a 64-bit width to a FIFO memory 35.

The PLL 34 transmits, as a write clock, a 167.0625-MHz clock obtained by dividing the 668.25-MHz clock received from the S/P conversion and multi-channel data forming unit 32 by 4 to the FIFO memory 35.

In addition, the PLL 34 transmits, as a read clock, a 83.5312-MHz clock obtained by dividing the 668.25-MHz clock received from the S/P conversion and multi-channel data forming unit 32 by 8 to the FIFO memory 35. Furthermore, the PLL 34 transmits an 83.5312-MHz clock as the write clock to a FIFO memory in a descrambling-8B/10B-P/S unit 38, which will be described below.

The PLL 34 transmits, as the read clock, a 37.125-MHz clock obtained by dividing the 668.25-MHz clock received from the S/P conversion and multi-channel data forming unit 32 by 18 to the FIFO memory of the descrambling-8B/10B-P/S unit 38. In addition, the PLL 34 transmits the 37.125-MHz clock as the write clock to the FIFO memory of the descrambling-8B/10B-P/S unit 38.

The PLL 34 transmits, as the read clock, a 74.25-MHz clock obtained by dividing the 668.25-MHz clock received from the S/P conversion and multi-channel data forming unit 32 by 9 to the FIFO memory of the descrambling-8B/10B-P/S unit 38.

The parallel data with the 64-bit width received from the multiplexing unit 33 is written to the FIFO memory 35 by the 167.0625-MHz clock received from the PLL 34. The parallel data written to the FIFO memory 35 is read as parallel data with a 128-bit width by the 83.5312-MHz clock received from the PLL 34 and is then transmitted to the data length conversion unit 36.

The data length conversion unit 36 includes a shift register and converts parallel data with a 128-bit width into parallel data with a width of 36×4 (=144) bits. Then, the data length conversion unit 36 detects K28.5 which is inserted into the timing reference signal SAV or EAV. In this way, each line period is determined and data for the timing reference signal SAV, an active line, the timing reference signal EAV, the line number LN, and the error detection code CRC and data for the horizontal auxiliary data space are converted into a 144-bit width. The parallel data with the 144-bit width, of which data length is converted by the data length conversion unit 36, is transmitted to a demultiplexing unit 37.

The demultiplexing unit 37 alternately demultiplexes the 8B/10B-converted data and the scrambled data from 10G-SDI. That is, the demultiplexing unit 37 demultiplexes the parallel data with the 144-bit width which is received from the data length conversion unit 36 into CH1, CH3, CH5, and CH7 each having a 20-bit width and CH2, CH4, CH6, and CH8 each having a 16-bit width before being multiplexed by the multiplexing unit 14 of the broadcast camera 1. The parallel data includes data for the timing reference signal SAV, the active line, the timing reference signal EAV, the line number LN, and the error detection code CRC and data for the horizontal auxiliary data space of the 8B/10B-encoded CH1 to CH8. Then, the parallel data with the 20-bit width and the parallel data with the 16-bit width of CH1 to CH8 are transmitted to the descrambling-8B/10B-P/S unit 38.

The descrambling-8B/10B-P/S unit 38 is used as a conversion unit that performs 8B/10B conversion for data with a predetermined number of bits among the demultiplexed data items, multiplexes the converted data into the odd-numbered serial digital interfaces, descrambles data with a predetermined number of bits, and multiplexes the descrambled data to the even-numbered serial digital interfaces. That is, the descrambling-8B/10B-P/S unit 38 descrambles input parallel data with a 16-bit width, performs 8B/10B decoding for the parallel data with a 16-bit width, converts the decoded data into serial data, and outputs the serial data.

A reproducing unit 39 performs a process opposite to the process of the mapping unit 11 in the broadcast camera 1 for the HD-SDI signals of CH1 to CH8 which are transmitted from the descrambling-8B/10B-P/S unit 38 according to SMPTE 435. In this way, the reproducing unit 39 reproduces a 3840×2160/23.98P-60P/4:4:4/10-bit signal. The 3840×2160/23.98P-60P/4:4:4/10-bit compressed signal generated by the reproducing unit 39 is output from the CCU 2 to, for example, a VTR (not shown).

The CCU 2 performs signal processing for the side which receives the 10.692-Gbps serial data generated by the broadcast camera 1. The CCU 2 generates parallel data from the 10.692-Gbps serial data and demultiplexes the parallel data into data with a 20-bit width and data with a 16-bit width. The demultiplexed data can be descrambled to reproduce the original data.

According to the signal transmission system 10 of the second embodiment, the compressed data of a large-volume video signal, such as a 2 k, 4 k, or 8 k video signal, can be mapped in the unit of 8 bits to the effective areas or the V blank areas of HD-SDIs or 3G-SDIs of a plurality of channels and then transmitted. In addition, CRC is added to the C channel and the Y channel into which the compressed data is multiplexed, on the basis of SMPTE ST 292-1, the channels are multiplexed in the unit of 10 bits in the order of C, Y, C, Y, . . . , and the multiplexed data is scrambled. Then, the compressed data is extracted in the unit of 8 bits from HD-SDIs or 3G-SDIs of a plurality of channels, 8B/10B encoding and a scrambling process are performed for the compressed data, and the processed data is alternately multiplexed. In this way, data can be multiplexed into a 10-G signal as 10G-SDI and the multiplexed signal can be transmitted and received.

3. Third Embodiment

Transmission System Using Mode F in 10G-SDI

Next, a transmission system according to a third embodiment of the present disclosure will be described with reference to FIGS. 12 to 15. In this embodiment, the mode F is used as the transmission system. Hereinafter, the mode F, which is the transmission system in which compressed data which is multiplexed into HD-SDIs of 7 channels and HD-SDI of one channel are multiplexed, will be described.

In the transmission system using the mode F, it is necessary to transmit all data included in HD-SDI of one channel in addition to the compressed data of a video signal of 2 k, 4 k, or 8 k pixels. HD-SDI is used to transmit, for example, control commands, videos, or sounds from a camera to a CCU. Unlike the mode E in which only the lower 8 bits are extracted and transmitted, it is necessary to transmit all data. Therefore, in the mode F, compressed data which is multiplexed into HD-SDIs of a maximum of 7 channels and HD-SDI of one channel can be multiplexed into 10G-SDI and then transmitted.

A method in which a mapping unit 11 multiplexes the compressed data into HD-SDIs of a maximum of 7 channels is the same as the method performed by the mapping unit 4 according to the first embodiment. That is, the compressed data which is divided in the unit of 8 bits is multiplexed into every 10 bits of the effective areas of the C channel and the Y channel of HD-SDI. In this way, the compressed data is multiplexed into the effective areas of HD-SDIs of 7 channels, or 3G-SDIs of 4 channels, which are HD-SDIs into which the compressed data is multiplexed and which are created in the unit of 2 channels and the unit of a word, are used as the input and output of the 10G-SDI.

In the case of a 3G-SDI level B, the first and second channels of HD-SDI respectively correspond to data streams 1 and 2 of the first channel of 3G-SDI. The third and fourth channels of HD-SDI respectively correspond to data streams 1 and 2 of the second channel of 3G-SDI. The fifth and sixth channels of HD-SDI respectively correspond to data streams 1 and 2 of the third channel of 3G-SDI. The seventh channel of HD-SDI corresponds to data stream 1 of the fourth channel of 3G-SDI.

Figure 12:
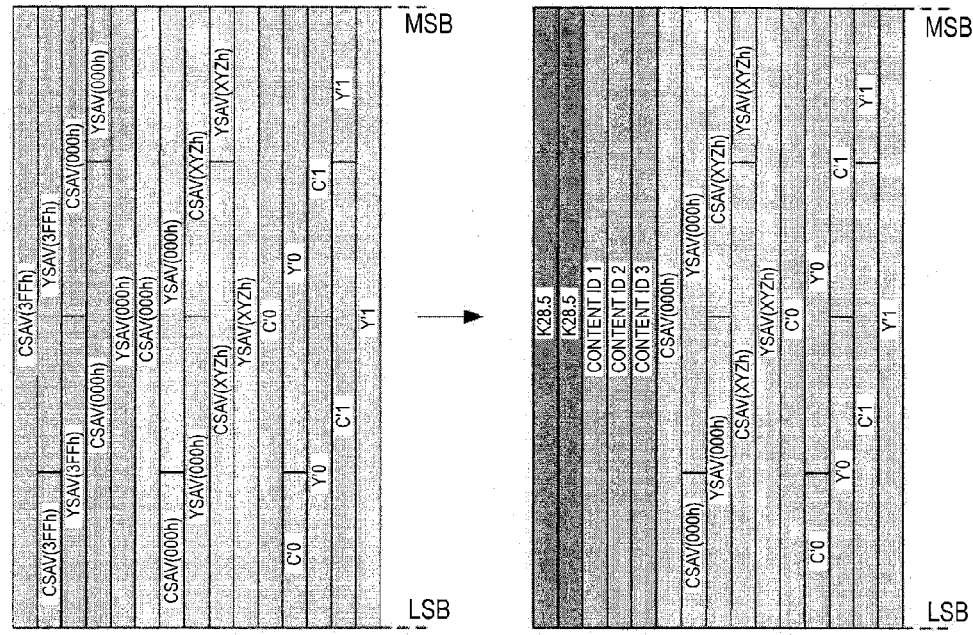
FIG. 12 is a diagram illustrating an example in which the initial two words of SAV according to a third embodiment of the present disclosure changes to K28.5.

FIG. 12 is a diagram illustrating an example in which the initial two words of SAV change to K28.5.

During 8B/10B conversion, an S/P-scrambling-8B/10B unit 12 changes the initial two words (16 bits) of SAV in the first channel of HD-SDI to 2-byte K28.5 and uses it as a word synchronous signal of an 8B/10B conversion code. Then, three 16-bit data items are used as a content ID.

Figure 13:
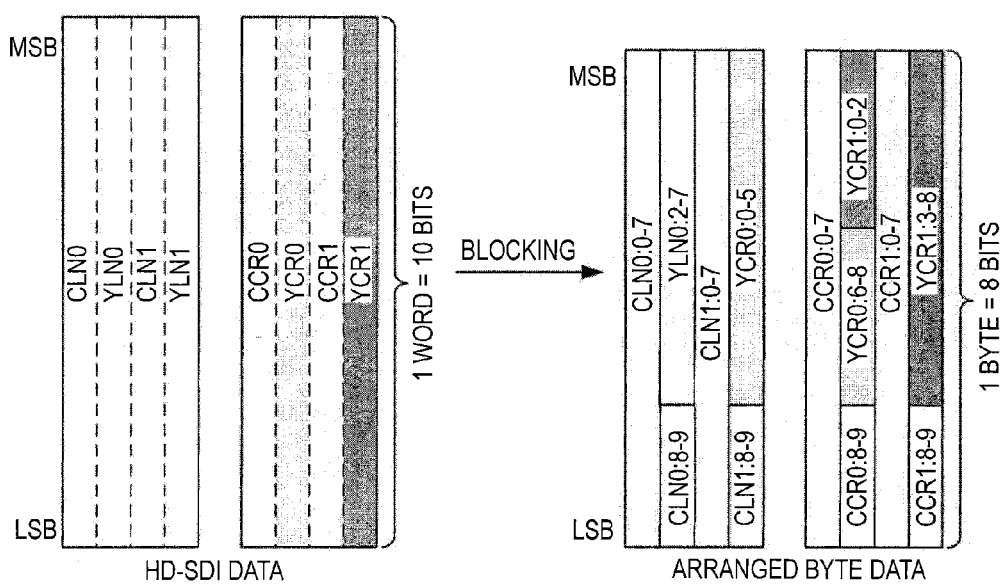
FIG. 13 is a diagram illustrating an example of the multiplexing of LN/CRC according to the third embodiment of the present disclosure.

FIG. 13 is a diagram illustrating an example of the multiplexing of LN/CRC.

For LN/CRC of HD-SDIs of the second to eighth channels, since CLN and YCL are equal to each other, a YLN signal is discarded and CLN, CCR, and YCR are rearranged and multiplexed as 8-bit data. In this way, 10.692-Gbps serial data is created.

The multiplexing unit 14 rearranges HD-SDI data in the order of (1) to (7) to multiplex the HD-SDI data.

(1) In LN, CLN0:0 to CLN0:7, which are the lower 8 bits of CLN0, are multiplexed.

(2) Subsequently to CLN0:0 to CLN0:7, CLN0:8 to CLN0:9 and YLN0:2 to YLN0:7 are multiplexed. Since CLN and YLN includes the same data and the content of YLN0:2 to YLN0:7 is determined from CLN0:2 to CLN0:7, data, such as all 1, may be incorporated into YLN0:2 to YLN0:7.

(3) Subsequently to YLN0:2 to YLN0:7, CLN1:0 to CLN1:7 are multiplexed.

(4) Subsequently to CLN1:0 to CLN1:7, CLN1:8 to CLN1:9 and YCR0:0 to YCR0:5 are multiplexed.

(5) Subsequently to YCR0:0 to YCR0:5, CCR0:0 to CCR0:7 are multiplexed.

(6) Subsequently to CCR0:0 to CCR0:7, CCR0:8 to CCR0:9, YCR0:6 to YCR0:8, and YCR1:0 to YCR1:2 are multiplexed.

(7) Subsequently to YCR1:0 to YCR1:2, CCR1:0 to CCR1:7, CCR1:8 and CCR1:9, and YCR1:3 to YCR1:8 are multiplexed.

Since B9 of the CRC is an inverted bit of B8, it is removed and is not multiplexed into the 10.692-Gbps serial data. As described in the first embodiment, CCRC and YCRC are data which is calculated after the compressed data is multiplexed.

Figure 14:
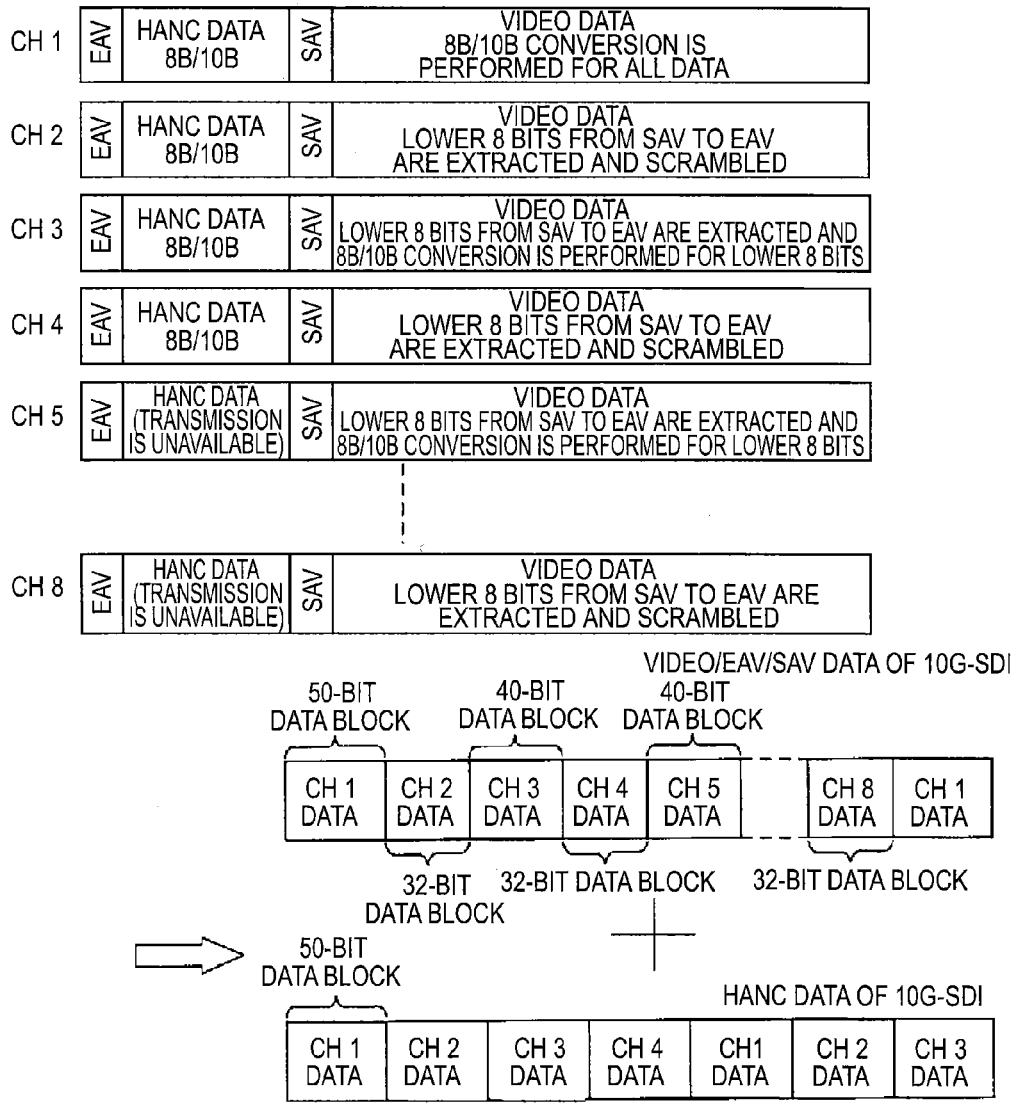
FIG. 14 is a conceptual diagram illustrating an example of multiplexing in a mode F according to the third embodiment of the present disclosure.

FIG. 14 is a conceptual diagram illustrating an example of multiplexing in the mode F.

8B/10B conversion is performed for data which is extracted in the unit of 40 bits (the unit of 10 bits and 4 samples) immediately after CRC from the first, second, third, and fourth channels of HD-SDI and the converted data is alternately multiplexed into an H blank area of a 10.692-Gbps interface with a 50-bit data block. Then, in order to perform synchronization with the period of one line, D0.0, which is an 8B/10B code of additional data, is multiplexed for synchronization with the H blank period of the 10.692-Gbps serial digital interface.

Then, the S/P-scrambling-8B/10B unit 12 performs 8B/10B conversion for the compressed data which is sequentially extracted in the unit of 40 bits (10-bit data in the unit of four samples), which are from the initial word of SAV to the effective area and EAV/LN/CRC, from the first channel of HD-SDI and obtains a 50-bit data block. In addition, the S/P-scrambling-8B/10B unit 12 extracts 8 bits, which are from the initial word of SAV to EAV/LN/CRC, from each of the second, fourth, sixth, and eighth channels of HD-SDI, sequentially scrambles 32-bit (8-bit data in the unit of four samples) compressed data to obtain a 32-bit data block.

The S/P-scrambling-8B/10B unit 12 extracts 8 bits, which are from the initial word of SAV to EAV/LN/CRC, from each of the third, fifth, and seventh channels of HD-SDI. Then, the S/P-scrambling-8B/10B unit 12 sequentially performs 8B/10B conversion for 32-bit (the unit of four samples and 8 bits) data to obtain a 40-bit data block.

The multiplexing unit 14 alternately multiplexes the 50-bit data block obtained by extracting data in the unit of 40 bits from the first channel of HD-SDI and performing 8B/10B conversion for the data, the 32-bit data block obtained by extracting data in the unit of 32 bits from the second, fourth, sixth, and eighth channels of HD-SDI and scrambling the data, and the 40-bit data block obtained by extracting data in the unit of 32 bits from the third, fifth, and seventh channels of HD-SDI and performing 8B/10B conversion for the data in the order of CH1, CH2, CH3, CH4, CH5, CH6, CH7, CH8, CH1, CH2, . . . , converts a parallel signal into a serial signal, and outputs the serial signal as the effective period and SAV/

EAV/LN/CRC period of the 10.692-Gbps serial signal. The number of bits of the signal output from the multiplexing unit 14 is calculated as follows.

$$\text{SAV, video data, and EAV/LN/CRCC period} = 50+32+ \\ 40+32+40+32+40+32 = 298 \text{ bits} \quad (1)$$

$$H \text{ blank period} = 50+50 = 100 \text{ bits.} \quad (2)$$

Figure 15:
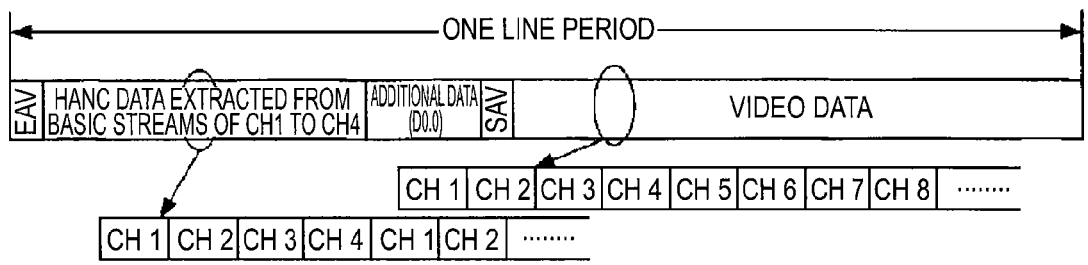
FIG. 15 is a diagram illustrating an example of the line structure of the mode F according to the third embodiment of the present disclosure.

FIG. 15 is a diagram illustrating an example of the line structure of the mode F.

The multiplexing unit 14 multiplexes the 8B/10B-converted 50-bit data and the scrambled 32-bit data into 10G-SDI. In this case, the horizontal auxiliary data space extracted from HD-SDIs of CH1 to CH4 is multiplexed in the order of CH1, CH2, CH3, CH4, CH1, . . . . Similarly, all data from HD-SDI of CH1 is multiplexed into 10G-SDI. Data obtained by extracting the lower 8 bits, which are from SAV to EAV, from HD-SDIs of CH2, CH4, CH6, and CH8 and scrambling them is multiplexed into 10G-SDI. In addition, data obtained by extracting the lower 8 bits, which are from SAV to EAV, from HD-SDIs of CH3, CH5, and CH7 and performing 8B/10B conversion for them is multiplexed into 10G-SDI.

The following Table 5 shows the number of data items in one line, the number of data items in a video data area, the number of data items in a horizontal auxiliary data space (HANC) area and SAV/EAV/LN/CRC, and the number of additional data items for each frame rate of the 10.692-Gbps interface.

TABLE 5

| Frame rate | Total number of words per line (bits) | Video data (bits) | Data in HANC and EAV/SAV (bits) | Additional data (bits) |
|---|---|---|---|---|
| 23.98 Hz or 24 Hz | 396000 | 286080 | CH1, 2, 3, 4  83588 | 26332 |
| 25 Hz | 380160 | 286080 | CH1, 2, 3, 4  72588 | 21492 |
| 29.97 Hz or 30 Hz | 316800 | 286080 | CH1, 2, 3, 4  28588 | 2132 |

Image data, H blank data, and additional data in one line in mode F

According to the signal transmission systems according to the second and third embodiments, 2 samples or 4 samples (a plurality of samples) of 8-bit data which is multiplexed to the effective area of HD-SDI or 3G-SDI of a given channel are sequentially extracted from SAV of the compressed data transmitted from HD-SDIs or 3G-SDIs of a plurality of channels and 8B/10B conversion is performed for the extracted samples. In addition, 2 samples or 4 samples (a plurality of samples) of 8-bit data which is multiplexed to the effective area of HD-SDI or 3G-SDI of another channel are sequentially extracted and a scrambling process is performed for the extracted samples. Then, the 8B/10B-converted data and the scrambled data are alternately arranged and multiplexed to create a 10.692-Gbps serial data series. In this way, one serial signal can be transmitted.

4. Modifications

A series of processes according to the above-described embodiments may be implemented by hardware or software. When a series of processes is implemented by software, it can be performed by a computer in which a program forming the software is incorporated into dedicated hardware or a computer in which programs for performing various functions is installed. For example, a program forming desired software may be installed in a general-purpose personal computer and then executed.

A recording medium which stores program codes of software for implementing the functions of the above-described embodiments may be supplied to the system or the apparatus. In addition, a computer (or a control device, such as a CPU) of the system or the apparatus may read the program codes stored in the recording medium and execute the program codes to implement the functions.

In this case, for example, a flexible disk, a hard disk, an optical disc, a magneto-optical disk, a CD-ROM, a CD-R, a magnetic tape, a non-volatile memory card, or a ROM may be used as the recording medium for supplying the program codes.

The program codes read by the computer are executed to implement the functions of the above-described embodiments. In addition, for example, an OS which operates on the computer performs some or all of the actual processes on the basis of instructions from the program codes. The functions of the above-described embodiments may be implemented by the processes.

The present disclosure is not limited to the above-described embodiments, but various applications and modifications can be made without departing from the scope and spirit of the present disclosure described in the appended claims.

The present disclosure may be configured as follows.

(1) A signal transmitting apparatus including: when upper m bits (m≥8) are defined to have the same value in a forbidden code in video data areas of first and second channels included in serial digital interfaces of one channel or a plurality of channels which are formed in a unit of N bits (N≥10), a mapping unit that makes at least lower 2 bits among the upper m bits of the N bits included in the one channel or the plurality of channels different from each other, multiplexes video data of upper m−2 bits included in compressed data which is compressed to the amount of data of the one channel or the plurality of channels of the serial digital interfaces in which the number of pixels in one frame is equal to or more than the number of pixels defined by an HD format into upper m−2 bits in the video data areas of the first channel and the second channel, and multiplexes video data of lower 2 bits in the compressed data into lower N−m bits in the video data areas of the first channel and the second channel; and a multiplexing unit that stores an error detection code of N-bit data multiplexed into the video data areas of the first channel and the second channel in a first data area and a second data area based on a predetermined standard, alternately multiplexes the first channel and the second channel for every N bits, scrambles the multiplexed data, and transmits the scrambled data using the serial digital interface.

(2) The signal transmitting apparatus according to (1), further including a conversion unit that performs 8B/10B conversion for data of a predetermined number of bits which is extracted from odd-numbered serial digital interfaces among the serial digital interfaces of the plurality of channels and scrambles data of a predetermined number of bits which is extracted from even-numbered serial digital interfaces wherein the multiplexing unit alternately connects the 8B/10B-converted data and the scrambled data and output the connected data as a 10.692-Gbps serial digital interface.

(3) The signal transmitting apparatus according to (1) or (2), wherein the serial digital interface is 3G-SDI or HD-SDI.

(4) A signal transmitting method including: when upper m bits (m≥8) are defined to have the same value in a forbidden code in video data areas of first and second channels included in serial digital interfaces of one channel or a plurality of channels which are formed in a unit of N bits (N≥10), making at least lower 2 bits among the upper m bits of the N bits included in the one channel or the plurality of channels different from each other, multiplexing video data of upper m−2 bits included in compressed data which is compressed to the amount of data of the one channel or the plurality of channel of the serial digital interfaces in which the number of pixels in one frame is equal to or more than the number of pixels defined by an HD format into upper m−2 bits in the video data areas of the first channel and the second channel, and multiplexing video data of lower 2 bits in the compressed data into lower N−m bits in the video data areas of the first channel and the second channel; and storing an error detection code of N-bit data multiplexed into the video data areas of the first channel and the second channel in a first data area and a second data area based on a predetermined standard, alternately multiplexing the first channel and the second channel for every N bits, scrambling the multiplexed data, and transmitting the scrambled data using the serial digital interface.

(5) A signal receiving apparatus including: when upper m bits (m≥8) are defined to have the same value in a forbidden code in video data areas of first and second channels included in serial digital interfaces of one channel or a plurality of channels which are formed in a unit of N bits (N≥10), a demultiplexing unit that alternately demultiplexes the first channel and the second channel from the serial digital interfaces of the one channel or the plurality of channels for every N bits and performs descrambling to restore an error detection code of N-bit data in the video data areas of the first channel and the second channel stored in a first data area and a second data area which are based on a predetermined standard; and a reproducing unit that reproduces video data of upper m−2 bits other than lower 2 bits which have different values among the upper m bits of the N bits included in the one channel or the plurality of channels, as upper m−2 bits in compressed data which is compressed to the amount of data of the one channel or the plurality of channels of the serial digital interfaces in which the number of pixels in one frame is equal to or more than the number of pixels defined by an HD format, from the upper m−2 bits in the video data areas of the first channel and the second channel, and reproduces video data of lower N−m bits as lower 2 bits in the compressed data from lower N−m bits in the video data areas of the first channel and the second channel.

(6) The signal receiving apparatus according to (5), further including: a demultiplexing unit that alternately demultiplexes 8B/10B-converted data and scrambled data from a 10.692-Gbps serial digital interface; and a conversion unit that performs 8B/10B conversion for data of a predetermined number of bits among the demultiplexed data items, multiplexes the converted data into odd-numbered serial digital interfaces, descrambles data of a predetermined number of bits, and multiplexes the descrambled data into even-numbered serial digital interfaces.

(7) The signal receiving apparatus according to (5) or (6), wherein the serial digital interface is 3G-SDI or HD-SDI.

(8) A signal receiving method including: when upper m bits (m≥8) are defined to have the same value in a forbidden code in video data areas of first and second channels included in serial digital interfaces of one channel or a plurality of channels which are formed in a unit of N bits (N≥10), alternately demultiplexing the first channel and the second channel from the serial digital interfaces of the one channel or the plurality of channels for every N bits and performing descrambling to restore an error detection code of N-bit data in the video data areas of the first channel and the second channel stored in a first data area and a second data area which are based on a predetermined standard; and reproducing video data of upper m−2 bits other than lower 2 bits which have different values among the upper m bits of the N bits included in the one channel or the plurality of channels, as upper m−2 bits in compressed data which is compressed to the amount of data of the one channel or the plurality of channels of the serial digital interfaces in which the number of pixels in one frame is equal to or more than the number of pixels defined by an HD format, from the upper m−2 bits in the video data areas of the first channel and the second channel, and reproducing video data of the lower N−m bits as lower 2 bits in the compressed data from lower N−m bits in the video data areas of the first channel and the second channel.

(9) A signal transmission system including a signal transmitting apparatus and a signal receiving apparatus. When upper m bits (m≥8) are defined to have the same value in a forbidden code in video data areas of first and second channels included in serial digital interfaces of one channel or a plurality of channels which are formed in a unit of N bits (N≥10), the signal transmitting apparatus includes: a mapping unit that makes at least lower 2 bits among the upper m bits of the N bits included in the one channel or the plurality of channels different from each other, multiplexes video data of upper m−2 bits included in compressed data which is compressed to the amount of data of the plurality of channels of the serial digital interfaces in which the number of pixels in one frame is equal to or more than the number of pixels defined by an HD format into upper m−2 bits in the video data areas of the first channel and the second channel, and multiplexes video data of lower 2 bits in the compressed data into lower N−m bits in the video data areas of the first channel and the second channel; and a multiplexing unit that stores an error detection code of N-bit data multiplexed into the video data areas of the first channel and the second channel in a first data area and a second data area based on a predetermined standard, alternately multiplexes the first channel and the second channel for every N bits, scrambles the multiplexed data, and transmits the scrambled data using the serial digital interface, and the signal receiving apparatus includes: a demultiplexing unit that alternately demultiplexes the first channel and the second channel from the serial digital interfaces of the one channel or the plurality of channels for every N bits and performs descrambling to restore an error detection code of N-bit data in the video data areas of the first channel and the second channel stored in the first data area and the second data area which are based on the predetermined standard; and a reproducing unit that reproduces video data of upper m−2 bits other than lower 2 bits which have different values among the upper m bits of the N bits included in the one channel or the plurality of channels, as upper m−2 bits in the compressed data, from the upper m−2 bits in the video data areas of the first channel and the second channel, and reproduces video data of the lower N−m bits as lower 2 bits in the compressed data from lower N−m bits in the video data areas of the first channel and the second channel.

The present disclosure contains subject matter related to that disclosed in Japanese Priority Patent Application JP 2012-106676 filed in the Japan Patent Office on May 8, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A signal transmitting apparatus comprising:
a plurality of channels, upper m bits (m≥8) being defined to have a same value in a forbidden code in video data areas of first and second channels included in serial digital interfaces of at least one channel, the plurality of channels being formed in a unit of N bits (N≥10);
a mapping unit configured to make at least lower 2 bits among the upper m bits of the N bits included in the one channel or the plurality of channels different from each other, multiplexes video data of upper m−2 bits included in compressed data which is compressed to an amount of data of the one channel or the plurality of channels of the serial digital interfaces in which a number of pixels in one frame is equal to or more than the number of pixels defined by an HD format into upper m−2 bits in the video data areas of the first channel and the second channel, and multiplexes video data of lower 2 bits in the compressed data into lower N−m bits in the video data areas of the first channel and the second channel; and
a multiplexing unit configured to store an error detection code of N-bit data multiplexed into the video data areas of the first channel and the second channel in a first data area and a second data area based on a predetermined standard, alternately multiplexes the first channel and the second channel for every N bits, scrambles the multiplexed data, and transmits the scrambled data using the serial digital interface.

2. The signal transmitting apparatus according to claim 1, further comprising:
a conversion unit that performs 8B/10B conversion for data of a predetermined number of bits which is extracted from odd-numbered serial digital interfaces among the serial digital interfaces of the plurality of channels and scrambles data of a predetermined number of bits which is extracted from even-numbered serial digital interfaces,
wherein the multiplexing unit alternately connects the 8B/10B-converted data and the scrambled data and outputs the connected data as a 10.692-Gbps serial digital interface.

3. The signal transmitting apparatus according to claim 2, wherein the serial digital interface is 3G-SDI or HD-SDI.

4. A signal transmitting method comprising:
when upper m bits (m≥8) are defined to have a same value in a forbidden code in video data areas of first and second channels included in serial digital interfaces of one channel or a plurality of channels which are formed in a unit of N bits (N≥10),
making at least lower 2 bits among the upper m bits of the N bits included in the one channel or the plurality of channels different from each other, multiplexing video data of upper m−2 bits included in compressed data which is compressed to an amount of data of the one channel or the plurality of channel of the serial digital interfaces in which a number of pixels in one frame is equal to or more than the number of pixels defined by an HD format into upper m−2 bits in the video data areas of the first channel and the second channel, and multiplexing video data of lower 2 bits in the compressed data into lower N−m bits in the video data areas of the first channel and the second channel; and
storing an error detection code of N-bit data multiplexed into the video data areas of the first channel and the second channel in a first data area and a second data area based on a predetermined standard, alternately multiplexing the first channel and the second channel for every N bits, scrambling the multiplexed data, and transmitting the scrambled data using the serial digital interface.

5. A signal receiving apparatus comprising:
a plurality of channels, upper m bits (m≥8) being defined to have a same value in a forbidden code in video data areas of first and second channels included in serial digital interfaces of at least one channel, the plurality of channels being formed in a unit of N bits (N≥10);
a demultiplexing unit that alternately demultiplexes the first channel and the second channel from the serial digital interfaces of the one channel or the plurality of channels for every N bits and performs descrambling to restore an error detection code of N-bit data in the video data areas of the first channel and the second channel stored in a first data area and a second data area which are based on a predetermined standard; and
a reproducing unit that reproduces video data of upper m−2 bits other than lower 2 bits which have different values among the upper m bits of the N bits included in the one channel or the plurality of channels, as upper m−2 bits in compressed data which is compressed to an amount of data of the one channel or the plurality of channels of the serial digital interfaces in which a number of pixels in one frame is equal to or more than the number of pixels defined by an HD format, from the upper m−2 bits in the video data areas of the first channel and the second channel, and reproduces video data of lower N−m bits as lower 2 bits in the compressed data from lower N−m bits in the video data areas of the first channel and the second channel.

6. The signal receiving apparatus according to claim 5, further comprising:
a demultiplexing unit that alternately demultiplexes 8B/10B-converted data and scrambled data from a 10.692-Gbps serial digital interface; and
a conversion unit that performs 8B/10B conversion for data of a predetermined number of bits among demultiplexed data items, multiplexes the converted data into odd-numbered serial digital interfaces, descrambles data of a predetermined number of bits, and multiplexes the descrambled data into even-numbered serial digital interfaces.

7. The signal receiving apparatus according to claim 6, wherein the serial digital interface is 3G-SDI or HD-SDI.

8. A signal receiving method comprising:
when upper m bits (m≥8) are defined to have a same value in a forbidden code in video data areas of first and second channels included in serial digital interfaces of one channel or a plurality of channels which are formed in a unit of N bits (N≥10),
alternately demultiplexing the first channel and the second channel from the serial digital interfaces of the one channel or the plurality of channels for every N bits and performing descrambling to restore an error detection code of N-bit data in the video data areas of the first channel and the second channel stored in a first data area and a second data area which are based on a predetermined standard; and
reproducing video data of upper m−2 bits other than lower 2 bits which have different values among the upper m bits of the N bits included in the one channel or the plurality of channels, as upper m−2 bits in compressed data which is compressed to an amount of data of the one channel or the plurality of channels of the serial digital interfaces in which a number of pixels in one frame is equal to or more than the number of pixels defined by an HD format, from the upper m−2 bits in the video data areas of the first channel and the second channel, and reproducing video data of the lower N−m bits as lower 2 bits in the compressed data from lower N−m bits in the video data areas of the first channel and the second channel.

9. A signal transmission system comprising:
a signal transmitting apparatus; and
a signal receiving apparatus,
wherein, when upper m bits (m≥8) are defined to have a same value in a forbidden code in video data areas of first and second channels included in serial digital interfaces of one channel or a plurality of channels which are formed in a unit of N bits (N≥10),
the signal transmitting apparatus includes
   a mapping unit configured to make at least lower 2 bits among the upper m bits of the N bits included in the one channel or the plurality of channels different from each other, multiplexes video data of upper m−2 bits included in compressed data which is compressed to an amount of data of the plurality of channels of the serial digital interfaces in which a number of pixels in one frame is equal to or more than the number of pixels defined by an HD format into upper m−2 bits in the video data areas of the first channel and the second channel, and multiplexes video data of lower 2 bits in the compressed data into lower N−m bits in the video data areas of the first channel and the second channel, and
   a multiplexing unit that stores an error detection code of N-bit data multiplexed into the video data areas of the first channel and the second channel in a first data area and a second data area based on a predetermined standard, alternately multiplexes the first channel and the second channel for every N bits, scrambles the multiplexed data, and transmits the scrambled data using the serial digital interface, and
the signal receiving apparatus includes
   a demultiplexing unit that alternately demultiplexes the first channel and the second channel from the serial digital interfaces of the one channel or the plurality of channels for every N bits and performs descrambling to restore an error detection code of N-bit data in the video data areas of the first channel and the second channel stored in the first data area and the second data area which are based on the predetermined standard, and
   a reproducing unit that reproduces video data of upper m−2 bits other than lower 2 bits which have different values among the upper m bits of the N bits included in the one channel or the plurality of channels, as upper m−2 bits in the compressed data, from the upper m−2 bits in the video data areas of the first channel and the second channel, and reproduces video data of the lower N−m bits as lower 2 bits in the compressed data from lower N−m bits in the video data areas of the first channel and the second channel.

\* \* \* \* \*